(12) United States Patent
Gaw et al.

(10) Patent No.: US 11,049,029 B2
(45) Date of Patent: Jun. 29, 2021

(54) IDENTIFYING CONTENT APPROPRIATE FOR CHILDREN ALGORITHMICALLY WITHOUT HUMAN INTERVENTION

(71) Applicant: Google Inc., Mountain View, CA (US)

(72) Inventors: Shirley Connie Gaw, Paris (FR); Sertan Girgin, Paris (FR); Eileen Margaret Peters Long, San Jose, CA (US)

(73) Assignee: Google LLC, Mountain View, CA (US)

( * ) Notice: Subject to any disclaimer, the term of this patent is extended or adjusted under 35 U.S.C. 154(b) by 694 days.

(21) Appl. No.: 14/628,288

(22) Filed: Feb. 22, 2015

(65) Prior Publication Data
US 2016/0247078 A1    Aug. 25, 2016

(51) Int. Cl.
*G06N 5/04* (2006.01)
*H04L 29/08* (2006.01)
*G06N 5/02* (2006.01)
*G06F 16/954* (2019.01)

(52) U.S. Cl.
CPC ........... *G06N 5/048* (2013.01); *G06F 16/954* (2019.01); *G06N 5/02* (2013.01); *H04L 67/104* (2013.01)

(58) Field of Classification Search
CPC .......... G06N 99/00; G06N 6/048; G06N 5/02; G06F 17/30828; G06F 16/954; H04L 67/104
See application file for complete search history.

(56) References Cited

U.S. PATENT DOCUMENTS

| | | | |
|---|---|---|---|
| 10,255,253 | B2 | 4/2019 | Akselrod et al. |
| 2012/0060176 | A1 | 3/2012 | Chai et al. |
| 2012/0109966 | A1 | 5/2012 | Liang et al. |
| 2014/0019544 | A1 | 1/2014 | Palmert |
| 2014/0052540 | A1 | 2/2014 | Giridhar Rajaran et al. |
| 2014/0101243 | A1 | 4/2014 | Naveh et al. |
| 2014/0196092 | A1 | 7/2014 | Chung et al. |
| 2014/0207860 | A1 | 7/2014 | Wang et al. |
| 2014/0280140 | A1 | 9/2014 | Ling et al. |

FOREIGN PATENT DOCUMENTS

| | | |
|---|---|---|
| CN | 1879413 A | 12/2006 |
| CN | 102804222 A | 11/2012 |
| CN | 104102713 A | 10/2014 |
| JP | 2007249907 | 9/2007 |

(Continued)

OTHER PUBLICATIONS

Y. Koren, R. Bell, and C. Volinsky, "Matrix Factorization Techniques for Recommender Systems", IEEE Computer, Aug. 2009, pp. 30-37.*

(Continued)

*Primary Examiner* — Vincent Gonzales
(74) *Attorney, Agent, or Firm* — Lowenstein Sandler LLP

(57) ABSTRACT

Implementations disclose identifying content appropriate for children algorithmically without human intervention. A method includes identifying, by a processing device, entities corresponding to topics relevant to children, determining, by the processing device, a children's affinity score for each of the identified entities, and selecting, by the processing device, content based on the children's affinity score for the identified entities corresponding to the content.

24 Claims, 8 Drawing Sheets

(56) References Cited

FOREIGN PATENT DOCUMENTS

| JP | 2010055391 | 3/2010 |
|----|------------|--------|
| JP | 2014078109 | 5/2014 |
| KR | 1020020073050 | 9/2002 |
| KR | 1020050004812 | 1/2005 |
| KR | 20140094615 A | 7/2014 |
| WO | 2014144931 A2 | 9/2014 |

OTHER PUBLICATIONS

PCT Search Report and The Written Opinion of the International Searching Authority for PCT Application No. PCT/US2016017028, dated Jun. 16, 2016, 9 pages.
Shoval, Peretz et al., "An ontology-content-based filtering method", International Journal, Jan. 1, 2008, 12 pages.
Blanco, Roi et al., "Entity Recommendations in Web Search", Yahoo! Labs, Oct. 21, 2013, 16 pages.
Gauch, Susan et al., "User Profiles for Personalized Information Access", Electrical Engineering and Computer Science Information & Telecommunication Technology Center, Apr. 24, 2007, 36 pages.
"Google Launches Knowledge Graph to Provide Answers, Not Just Links", http://searchengineland.com/google-launches-knowledge-graph-121585, [retrieved from the Internet on Jul. 1, 2016], May 16, 2012, 19 pages.
The extended European Search Report for EP Application No. EP16752798.5, dated Jan. 16, 2018, 9 pages.
Chinese Patent Application No. 201680011504.0, Office Action dated Mar. 4, 2020, 23 pages.
Japanese Patent Application No. 2019-106103, Office Action dated Jun. 1, 2020, 8 pages.

\* cited by examiner

300

- Identify entities and collections in KG data labeled with a children's topic  305
- Add identified entities and collections to an entity seed list  310
- Run query over KG data to infer entities interesting to children  315
- Add inferred entities to the entity seed list  320
- Identify external data source including topics interesting and/or relevant to children, including identifying format of data maintained in the external data source  325
- Extract topics from the external data source in accordance with the identified format  330
- Reconcile extracted topics with corresponding entities in KG data  335
- Add corresponding entities reconciled with the extracted topics to the entity seed list  340

Identify set of content items in corpus of content maintained by content sharing platform, the set of content items associated with a content rating appropriate for children
355

For each content item in the set, identify entities annotated for the content item
360

Add identified entities to an entity seed list
365

400

```
┌─────────────────────────────────────────────────────────────────┐
│ Receive entity seed list including one or more entities         │
│ identified as interesting and/or relevant to children           │
│                                                             410 │
└─────────────────────────────────────────────────────────────────┘
                                  ↓
┌─────────────────────────────────────────────────────────────────┐
│ Identify all content items annotated with entities from the     │
│ entity seed list                                                │
│                                                             420 │
└─────────────────────────────────────────────────────────────────┘
                                  ↓
┌─────────────────────────────────────────────────────────────────┐
│ Filter identified content items to remove content items that    │
│ do not meet predetermined initial qualifications                │
│                                                             430 │
└─────────────────────────────────────────────────────────────────┘
                                  ↓
┌─────────────────────────────────────────────────────────────────┐
│ Identify other content items related to the remaining           │
│ identified content items post-filtering, where the related      │
│ other content items are optionally filtered                     │
│                                                             440 │
└─────────────────────────────────────────────────────────────────┘
                                  ↓
┌─────────────────────────────────────────────────────────────────┐
│ Merge original and related content items into a single set      │
│ of content items                                                │
│                                                             450 │
└─────────────────────────────────────────────────────────────────┘
                                  ↓
┌─────────────────────────────────────────────────────────────────┐
│ Identify entity annotations corresponding to the content        │
│ items in the single set                                         │
│                                                             460 │
└─────────────────────────────────────────────────────────────────┘
                                  ↓
┌─────────────────────────────────────────────────────────────────┐
│ Group content items from the single set according to            │
│ identified entities                                             │
│                                                             470 │
└─────────────────────────────────────────────────────────────────┘
                                  ↓
┌─────────────────────────────────────────────────────────────────┐
│ For each entity group, calculate children's affinity score      │
│ for the entity based on function taking into account            │
│ annotation scores for content items in the group, average       │
│ quality of content items in the group, average popularity of    │
│ content items in the group, and average relatedness weight      │
│ between content items in the group                              │
│                                                             480 │
└─────────────────────────────────────────────────────────────────┘
```

```
┌─────────────────────────────────────────────────────────────────────┐
│ Identify set of candidate content channels based on predetermined   │
│ initial qualifications                                              │
│                                                                 510 │
└─────────────────────────────────────────────────────────────────────┘
                                    ▼
┌─────────────────────────────────────────────────────────────────────┐
│ Identify entities annotated for the candidate channels and the      │
│ children's affinity score associated with each identified entity    │
│                                                                 520 │
└─────────────────────────────────────────────────────────────────────┘
                                    ▼
┌─────────────────────────────────────────────────────────────────────┐
│ For each content item in each candidate channel, calculate average  │
│ children's affinity score for the content item based on all         │
│ entities annotated for the content item, where the average          │
│ children's affinity score for the content item is weighted by a     │
│ view count for the content item                                     │
│                                                                 530 │
└─────────────────────────────────────────────────────────────────────┘
                                    ▼
┌─────────────────────────────────────────────────────────────────────┐
│ For each candidate channel, aggregate weighted average children's   │
│ affinity scores calculated for the content items of the candidate   │
│ channel                                                             │
│                                                                 540 │
└─────────────────────────────────────────────────────────────────────┘
                                    ▼
┌─────────────────────────────────────────────────────────────────────┐
│ Assign aggregated weighted average children's affinity score as     │
│ the children's affinity score for the candidate channel             │
│                                                                 550 │
└─────────────────────────────────────────────────────────────────────┘
                                    ▼
┌─────────────────────────────────────────────────────────────────────┐
│ Normalize children's affinity scores for the candidate channels     │
│                                                                 560 │
└─────────────────────────────────────────────────────────────────────┘
                                    ▼
┌─────────────────────────────────────────────────────────────────────┐
│ Ranked candidate channels in accordance with normalized children's  │
│ affinity scores for the candidate channels                          │
│                                                                 570 │
└─────────────────────────────────────────────────────────────────────┘
                                    ▼
┌─────────────────────────────────────────────────────────────────────┐
│ Select top N ranked candidate channels as curated content for a     │
│ children's content interface of content sharing platform            │
│                                                                 580 │
└─────────────────────────────────────────────────────────────────────┘
```

FIG. 5

IDENTIFYING CONTENT APPROPRIATE FOR CHILDREN ALGORITHMICALLY WITHOUT HUMAN INTERVENTION

TECHNICAL FIELD

This disclosure relates to the field of content sharing platforms and, in particular, to identifying content appropriate for children algorithmically without human intervention.

BACKGROUND

On the Internet, social networks allow users to connect to and share information with each other. Many social networks include a content sharing aspect that allows users to upload, view, and share content, such as video content, image content, audio content, text content, and so on (which may be collectively referred to as "media items" or "content items"). Such viewable and shareable media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers, network-connected televisions) to use, play, and/or consume media items (e.g., watch digital videos, and/or listen to digital music).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes identifying, by a processing device, entities corresponding to topics relevant to children, determining, by the processing device, a children's affinity score for each of the identified entities, and selecting, by the processing device, content based on the children's affinity score for the identified entities corresponding to the content.

In one implementation, the entities may include at least one a person, place, or thing. In another implementation, identifying the entities in the method further includes selecting the entities from a knowledge graph comprising a knowledge base having structured information about a corpus of entities and relational connections between the corpus of entities, wherein the corpus of entities comprises the entities.

Furthermore, identifying the entities in the method may further include accessing an external source of data relevant to content for children, extracting topics for children from the external source of data, reconciling the extracted topics with the corpus of entities determined from the knowledge graph, and extending the entities from the knowledge graph with reconciled entities from the extracted topics. In one implementation, the external source of data comprises a trusted website that publishes rating and reviews for children-safe and children-interesting content.

In another implementation, determining the children's affinity score in the method further includes identifying content items annotated with the entities, identifying other content items related to the identified content items based on co-watch signals and co-occurrence signals, merging the identified other content items with the identified content items to generate a single set of content items, grouping the single set of content items by the entities annotated in the single set of content items to form an entity group for each entity, and for each entity having an entity group, calculating the children's affinity score for the entity based on at least one of annotation centrality, annotation relevance, average quality, popularity, or average relatedness weight of content items in the entity group. Furthermore, the method may include filtering the identified content items for at least one of language, quality, popularity, or content rating.

Additionally, selecting the content in the method may further include identifying a candidate set of content based on at least one of a category of content, upload state, or number of content items associated with content, for each candidate content: identifying entity annotations for each content item in the candidate content, determining an average rating and a view count for each content item in the candidate content, and aggregating the average rating and the view count from all content items of the candidate content weighted by the identified entity annotations to generate an aggregate score for the candidate content. Furthermore, selecting the content in the method may include normalizing the aggregated scores from all of the candidate content, and ranking the candidate content based on the normalized aggregated scores.

In a further embodiment, the selected content includes channels of a content sharing platform. In addition, the selected content may include playlists of the content sharing platform.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings.

FIGS. 3A and 3B are flow diagrams illustrating methods for identifying entities considered relevant and/or interesting to children, according to an implementation.

FIG. 4 is a diagram illustrating a method for assigning children's affinity scores to entities of a content sharing platform, according to an implementation.

FIG. 5 is a flow diagram illustrating a method for curating children's content for a children's content interface using children's affinity scores of entities of a content sharing platform, according to an implementation.

DETAILED DESCRIPTION

Aspects and implementations of the disclosure are directed to identifying content appropriate for children algorithmically without human intervention. Implementations are described for a children's content system of a content sharing platform, where the children's content system enables the identification, curation, and presentation of content appropriate and relevant for children. Children's content may refer to one or more content items that are safe (e.g., not mature, violent or explicit) and/or entertaining (e.g., relevant or interesting) for children.

Implementations of the disclosure may identify content that is interesting for children. For example, the children's content system may identify entities (e.g., person, place, or thing) that are interesting to children, algorithmically select and generate content (e.g., channels, playlists, videos, etc.) for different age groups for these entities, filter the content for appropriateness (e.g., based on a content rating), rank the filtered content according to popularity and other metrics, and publish the content to a children's content interface of the content sharing platform. A content rating may refer to an indication of a suitable viewing audience, such as "General Audiences," "Children," "Teenagers," "Adults," and/or any other suitable content ratings. For example, a content rating may include one of the indicators Y, G, PG, Teen, Mature, and so on. In one implementation, the children's content interface may include a home screen of a children's specific application associated with the content sharing platform.

Existing content curation solutions for children do not automate the process of identifying, curating, and presenting content appropriate and relevant for children. Prior solutions for children's content curation provided a whitelist approach where a small set of content is human-selected out of an entire corpus of content. However, in current content sharing platforms, there may be more uploaded content to the platform than is practical for humans to review (e.g., 300 hours of video uploaded to the platform every minute). Unlike aspects of the present disclosure, these prior solutions were not being performed algorithmically, did not use high volumes of content, and/or did not have a high rate of incoming, new content as well as a large volume of base content. Furthermore, the prior solution did not use content that did not have a content rating coming from a publisher of the content (as compared to, for example, traditional theatre movies or TV shows that have corresponding published content ratings).

The present disclosure often references videos for simplicity and brevity. However, the teaching of the present disclosure are applied to media items generally and can be applied to various types of content or media items, including for example, video, audio, text, images, program instructions, etc.

Figure 1:
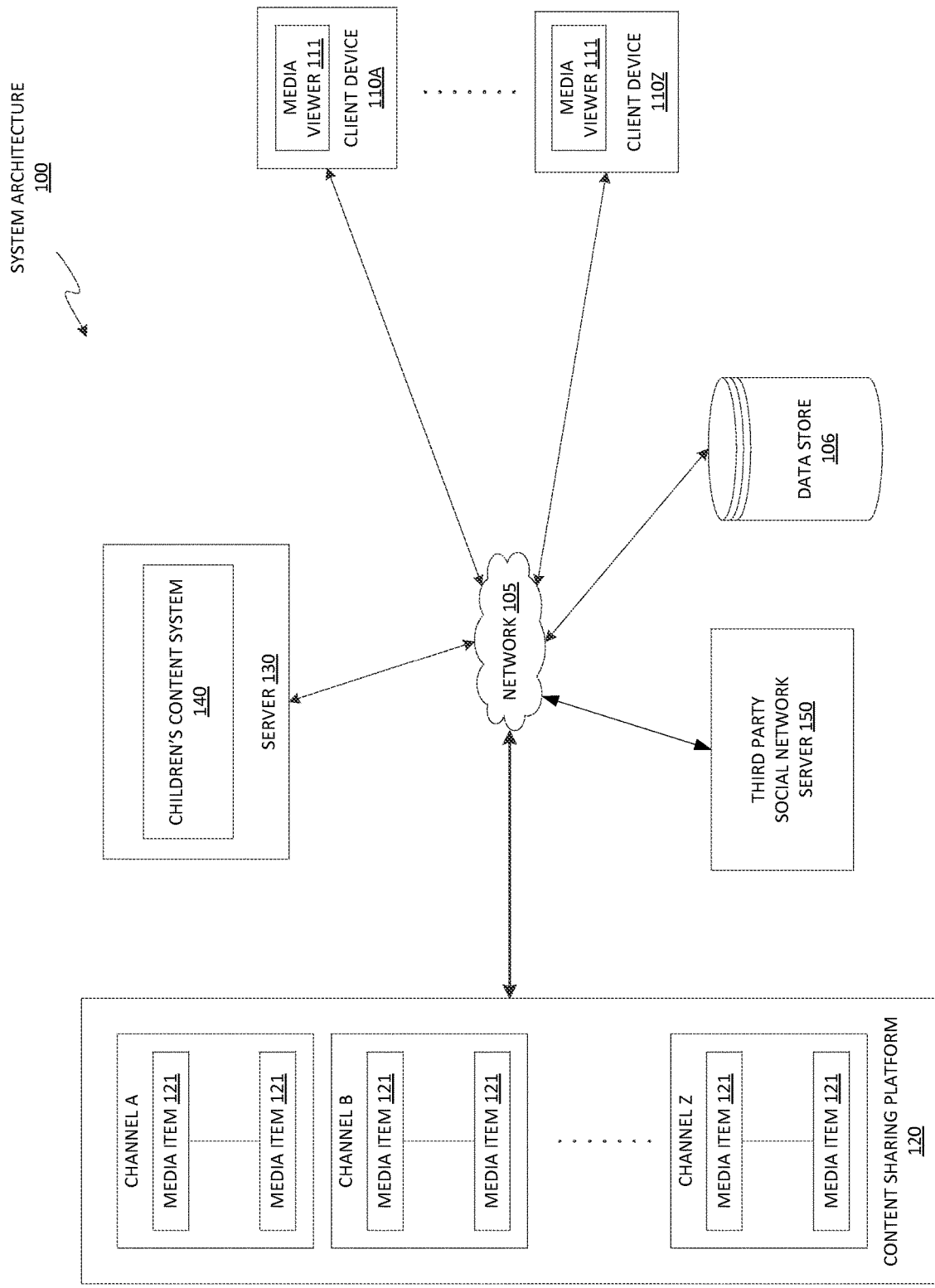
FIG. 1 is a block diagram illustrating an exemplary network architecture in which implementations of the present disclosure may be implemented.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.). According to aspects of the present disclosure, the media viewer 111 may a children-specific application that allows users to view and search for content appropriate for children.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a children's content system 140. The children's content system 140 enables the identification, curation, and presentation of content appropriate and relevant for children in implementations of the disclosure. Children's content may refer to one or more content items that are safe (e.g., not mature or explicit) and/or entertaining (e.g., relevant) for children.

Implementations of the disclosure may identify content that is interesting for children. For example, the children's content system 140 may identify entities (e.g., person, place, or thing) that are interesting to children, algorithmically-determine content for different age groups for these entities, filter the content for appropriateness (e.g., based on a content rating as described above), rank the filtered content according to popularity and other metrics, and publish the content to a children's content interface of the content sharing platform 120. Content may refer to videos, channels, playlists, etc. A playlist may include a list of content items (e.g., videos) that can be played (e.g., streamed) in sequential or shuffled order on the content sharing platform. In one implementation, the children's content interface may include a home screen of a children's specific application associated with the content sharing platform 120.

In some implementations, children's content system 140 of server 130 may interact with content sharing platform 120 and/or with other third party social network servers 150 to provide implementations of the disclosure. Further description of the children's content system 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
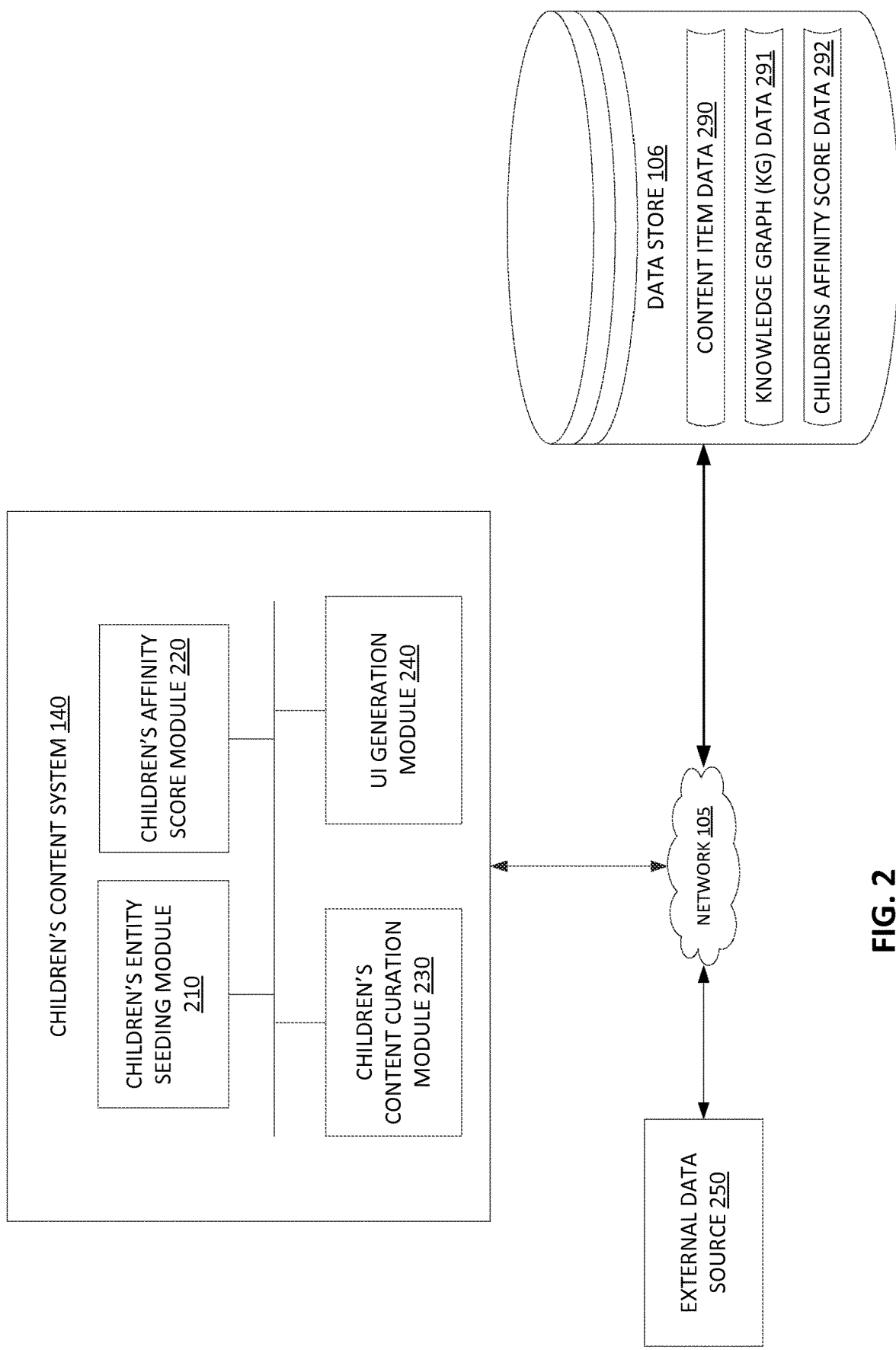
FIG. 2 is a block diagram illustrating a children's content system 140 in accordance with one implementation of the disclosure, according to an implementation.

FIG. 2 is a block diagram illustrating a children's content system 140 in accordance with one implementation of the disclosure. As discussed above, the children's content system 140 may interact with a single social network, or may be utilized among multiple social networks (e.g., provided as a service of a content sharing platform that is utilized by other third party social networks). In one implementation, the children's content system 140 includes a children's entity seeding module 210, a children's affinity score module 220, a children's content curation module 230, and a UI generation module 240. More or less components may be included in the children's content system 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The children's content system 140 is communicatively coupled to the data store 106. For example, the children's content system 140 may be coupled to the data store 106 via a network (e.g., via network 105 as illustrated in FIG. 1). In another example, the children's content system 140 may be coupled directly to a server where the children's content system 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, knowledge graph (KG) data 291, and children's affinity score data 292.

As discussed above, the children's content system 140 enables the identification, curation, and presentation of content appropriate and relevant for children in implementations of the disclosure. Children's content may refer to one or more content items that is safe (e.g., not mature or explicit) and/or entertaining (e.g., relevant) for children.

An initial concern of implementations of the disclosure is to identify topics that are of interest to children. The children's entity seeding module 210 may identify entities that are potentially interesting or relevant to children. An entity may refer to a person, place, or thing (e.g., TV show, movie, song, book, article, animal, etc.). Data store 106 may maintain a knowledge graph (KG) that is a knowledge base having structured information about a corpus of semantic entities and relational connections between the corpus of semantic entities. Each semantic entity (also referred to as "entity") has one or several types. Each content item maintained in content item data 290 of data store 106 may be annotated with the entity or entities associated with the content item. For example, "Dora the Explorer" is a topic, TV program, film series, and award-winning work. If a content item of content item data 290 was a Dora the Explorer TV episode, this content item would be annotated with the Dora the Explorer entity that is stored in the KG data 291.

In addition, the KG data 291 may include a higher-level of abstraction of collections, and may group entities into collections, such as "children's TV programs" or "musicians." Refer to the previous example, the "Dora the Explorer entity may be grouped into the children's TV programs collection (as well as other different collections) in KG data 291.

The children's entity seeding module 210 may utilize the entities of the KG data 291 to identify entities (and collections) that are interesting for children, and thereby utilize these identified entities to locate content and content items that may be interesting for children as well (e.g., the content items annotated with the identified entities). For example, some entity types and collections in the KG data 291 are relevant for children, such as the children's TV program collection or the movies for ages 5 to 7 collection. These entity types and collections provide an already-generated and curated list (in certain cases, age-bucketed), but restricted to a limited set of domains. Aside from these direct sources, the children's entity seeding module may also run queries over the KG data 291 to infer interesting entities. The distribution of the subjects of the books in a children's literature literary genre collection is such an example (e.g., top subjects are "Animal", "Adventure", and "Family").

In other implementations, the children's entity seeding module 210 may use the KG data 291 as well as other external data sources 250 to identify entities that are interesting to children. The external data sources 250 may include, but are not limited to, websites and applications that publish ratings and reviews for content (e.g., TV shows, movies, games, applications, websites, books, music, etc.) that is safe and/or interesting for children. The children's entity seeding module 210 may access the external data source 250 (e.g., via network 105) and extract topics from the external data source 250.

In one implementation, topics are extracted from an external data source 250 based on a format that the data is stored, maintained, and/or presented at the external data source 250. For example, if the external data source 250 maintains data in a directory format, the children's entity seeding module 210 may download each root category from the external data source 250 and then extract the links that point to the sub-categories in each root category. Information such as a content rating and age group associated with each link may also be extracted.

The extracted topics from external data sources 250 may then be reconciled with corresponding entities maintained in the KG data 291. As a result, an expanded set of entities from the KG data 291 may be identified as relevant and/or interesting to children.

In another implementation, the children's entity seeding module 210 may rely on the corpus of content (e.g., content item data 290) of the content sharing platform to identify entities interesting to children. The children's entity seeding module 210 may first identify the set of content items associated with a particular content rating, such as a Y rating or TV-Y rating. Annotated entities are identified among the set of content items and used to populate a list of entities that are relevant and/or interesting to children. In some implementations, the quality (e.g., user rating) and popularity (e.g., number of views) of the content items are used to select annotated entities.

In one implementation, the expanded set of entities identified as relevant and/or interesting to children is passed to children's affinity score module 220 to generate a children's affinity score for each identified entity. The children's affinity score module 220 may determine a children's affinity score for each entity in a variety of ways, depending on how the set of entities was generated.

When the set of entities is seeded from the KG data 291, with possible supplementation from external data sources 250, the children's affinity score module 220 may first identify all content items that have been annotated with these entities. Then, high-level filtering may be applied to remove, for example, certain language (e.g., non-English language content items) content items, content items with a mature or X rating, content items with a number of views below a threshold, and/or content items with a low quality (e.g., less than 3.0 out of 5).

The children's affinity score module 220 may then merge the resulting set of content items with any content items that are related to the set of content items. Content items may be considered related to one another based on signals including, but not limited to, number of co-watches by users and number of co-occurrences (e.g., in playlists). In some implementations, the related content items are also filtered on a high-level to remove certain language, mature content, low popularity, and low quality content.

The resulting single set of merged content items is then examined to identify entity annotations associated with the single set. The content items may then be grouped according the entity annotations. In some implementations, the content item may appear in multiple groups as a content item may have multiple different entity annotations corresponding to the content item. For each resulting entity, a children's affinity score for the entity may be calculated based on a function taking into account annotation scores for each content item in the group to the entity, an average quality of the content items in the group, average popularity of the content items in the group, and an average relatedness weight. In one implementation, the function aggregates these signals over the content items.

The annotation score may be a number from zero to one indicating how central/relevant an annotated entity is for the content item, where a higher value denotes that the entity is more central/relevant to the content item. The quality may be a score (e.g., on a scale of 1 to 5) that a user rates the content item. The popularity may indicate a number of views of the content item. The average relatedness weight may indicate how related content items are (e.g., in terms of co-watches and co-occurrences) to each other within the group. In some implementations, content items with an annotation score falling below a threshold value may be filtered out of the group. The result of the function as applied to the entity group is a children's affinity score for the particular entity.

In one implementation, when entities that are interesting and relevant to children are identified directly from the corpus of content of the content sharing platform, the entities may be identified from annotations of a set of content items (e.g., TV-Y rated content items, etc.) in the corpus. Each content item may have an annotation score for a particular entity. This annotation score may be a number from zero to one that indicating how central/relevant an annotated entity is for the content item, where a higher value denotes that the entity is more central/relevant to the content item.

For each identified entity, the children's entity seeding module 210 may aggregate the annotation scores associated with the entity over the set of content items, where each annotation score may be weighted by a view count for the content item associated with the particular annotation score (e.g., annotation scores for more popular content items are weighted more heavily in the aggregate of annotation scores for a particular entity). The result of the aggregation of weighted annotation scores for each entity is a global children's affinity score (also referred to as a global popularity score) of the entity in terms of the set of content items. This global children's affinity score may be stored as the children's affinity score for the entity, for example in children's affinity score data 292 of data store 106.

A children's affinity score for each entity may also be collection specific. If the children's affinity score is to be calculated for each entity in a collection, the children's entity seeding module 210 may first identify the collections in the KG data 291 that the identified entities are members. The global children's affinity score for the entity may be multiplied (or some other function performed) with a collection membership score associated with the entity/collection pair. The collection score may denote the strength of the entities membership in the collection, with a higher score indicating a more central/relevant relationship to the collection. The resulting number may be considered the collection-based children's affinity score of the entity.

In some implementations, the resulting entities identified as interesting to children are also used to assign a children's affinity score directly to content items (e.g., videos and other content sharing platform content) based on the annotations that the content items have for such entities.

The children's content curation module 230 may then utilize the calculated children's affinity score for entities in the KG data 291 to curate children's content for the content sharing platform. The following description discusses content curation in terms of identifying channels of the content sharing platform that are relevant and interesting for children. In other implementation, different types of content may also be identified including, but not limited to playlists and individual content items (e.g., videos). In one implementation, the children's content curation module 230 curates children's content for display on a home screen of a children's-specific application or web page of the content sharing platform. In other implementations, children's content curation module 230 may curate children's content for other purposes, such as for search results, recommendations, watch next/related content, and so on.

When selecting channels that may be considered interesting or relevant to children, the children's content curation module 230 may first identify a set of candidate channels. The set of candidate channels may be selected based on satisfying one or more predetermined qualifications. The qualifications may include, but are not limited to, one or more of categories, upload state, number of content items in the channel, review status, and/or content rating (e.g., Y or G) of the channel.

The category qualification may include the channel being classified in one or more categories. The categories may be pre-determined categories displayed on a home screen of a children's content interface and may include categories such as shows, music, learning, explore, do-it-yourself, hobbies, science, experiments, dinosaurs, etc. In some implementations, the categories may be personalized based on specific interest of users.

The upload state qualification may include selecting as candidates those channels that satisfy particular upload status constraints, such as the upload time of the most recent video being less than a predetermined threshold of time. For example, a channel may be selected as a candidate channel when it includes at least one content item that was uploaded to the channel less than one year ago. Similarly, the number of content items in the channel qualification may result in channels being selected as candidates when the channels include more than a predetermined threshold number of content items in the channel. This prevents channels that are not active or channels with a small number of content items from being selected as candidate channels.

Lastly, the review status qualification may include selecting those channels with a flag (or other marker) that is set to indicate a human or automated review of the channel has previously occurred to examine the content items in the channel. The examination of the content items in the channel may determine whether the material of the content item is appropriate for children and/or relevant to children. For example, content items related to taxes may be appropriate in terms of a content rating for children, but may not be relevant to children.

Once a candidate set of channels is selected, the children's content curations module 230 may then identify the entities that are annotated for the content items in each candidate channel as well as the children's affinity score for each entity (calculated by children's affinity score module 220 as discussed above). For each content item in a candidate channel, an average children's affinity score for the content item and a view count for the content item is determined. In one implementation, the view count may be used as weighting factor for the children's affinity score, so that content items with a higher view count have the associated average children's affinity score weighted more than a content item with a lower view count. The resulting weighted children's affinity score is assigned to the content item.

For each candidate channel, the weighted children's affinity scores for the content items in a channel are aggregated to generate a children's affinity score for the candidate channel. In one implementation, the children's affinity scores for the candidate channels are then normalized. The candidate channels are then ranked based on the resulting children's affinity scores for the candidate channels, with a channel having the highest score ranked first, and so on. The top N channels from the ranking may then be selected for display on a children's content interface (e.g., home screen of a children's application of the content sharing platform or in a second category within the home screen of the children's application).

Figure 6:
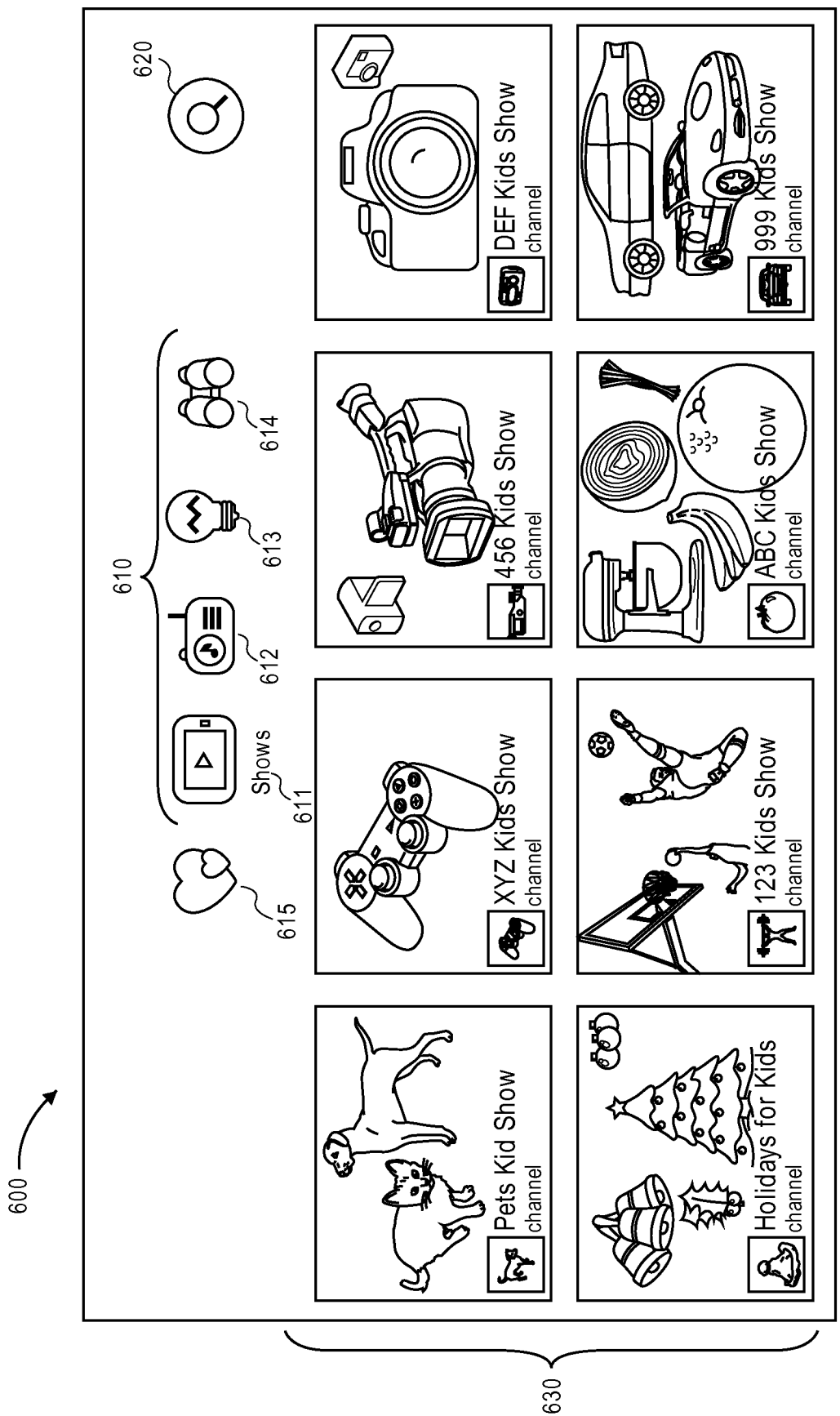
FIG. 6 illustrates an example screenshot of a children's home screen UI providing content suggestions for children from a content sharing platform according to implementations of the disclosure

The selected channels may then be provided to the UI generation module 240. The UI generation module 240 may associate formatting and other UI elements to generate a page or screen that displays the selected channels as content that is interesting and/or relevant to children. In some implementations, there is an optional manual (e.g., human) review of the selected channels before they are displayed in the UI. In further implementations, playlist may be generated and/or selected for display in the UI. FIG. 6 discussed further below provides an example children's home screen UI 600 of a children's interface providing content (e.g., channels) that are curated as interesting and/or relevant to children.

Figure 3B:

FIGS. 3A and 3B are flow diagrams illustrating methods 300, 350 for identifying entities considered relevant and/or interesting to children according to some implementations of the disclosure. The methods 300, 350 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300, 350 may be performed by children's entity seeding module 210 as shown in FIG. 2.

Referring to FIG. 3A, method 300 identifies entities considered relevant and/or interesting to children using KG data and optionally external data sources. Method 300 begins at block 305 when entities and collections in KG data are identified that are labeled with a children's topic. At block 310, the identified entities and collections are added to an entity seed list. Then, at block 315, a query is run over the KG data to infer entities that are interesting and/or relevant to children. At block 320, the inferred entities are also added to the entity seed list.

Blocks 325 through 340 are optionally performed by children's seed entity module 210 in implementations of the disclosure. At block 325 an external data source that includes topics interesting and/or relevant to children is identified. In one implementation, a format of data maintained at the external data source is also identified. Subsequently, at block 330, topics are extracted from the external data source in accordance with the identified format. At block 335, the extracted topics are reconciled with corresponding entities in the KG data. Lastly, at block 340, the corresponding entities reconciled with the extracted topics are added to the entity seed list.

Referring to FIG. 3B, method 350 identifies entities considered relevant and/or interesting to children using a corpus of content maintained at a content sharing platform. Method 350 begins at block 355 when a set of content items is identified from the corpus of content maintained by the content sharing platform. In one implementation the identified set of content items are those associated with a content rating appropriate for children (e.g., Y or G rating).

Subsequently, at block 360, for each content item in the set, entities that are annotated for the content item are identified. In some implementations, the quality (e.g., user rating) and/or popularity (e.g., number of views) of the content items are used for identifying entity annotations. Lastly, at block 365, the identified entities are added to an entity seed list.

FIG. 4 is a flow diagram illustrating a method 400 for assigning children's affinity scores to entities of a content sharing platform according to an implementation of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by children's affinity score module 220 as shown in FIG. 2.

Method 400 begins at block 410 when an entity seed list is received including one or more entities identified as interesting and/or relevant to children. Then, at block 420, all content items annotated with the entities from the entity seed list are identified. In one implementation, the content items include those content items stored and/or maintained by the content sharing platform.

At block 430, the identified content items are filtered to remove the content items that do not meet predetermined qualifications. In one implementation, the predetermined qualifications may include, but is not limited to, a language of the content item (e.g., English), a content rating (e.g., anything but mature or X) of the content item, popularity (e.g., view count) of content item (e.g., greater than a threshold number of views), and a quality of the content item (e.g., greater than 3.0 out of 5). In one implementation, the filtering at block 430 may optionally be performed at a later time in the process of method 400 or immediately prior to selection of content for display in a children's content interface of the content sharing platform.

At block 440, other content items related to the filtered (optionally) content items are identified. In some implementations, relation between content items is based on co-watches and/or co-occurrences of the content items. In one implementation, the related content items are also filtered based on the predetermined qualifications discussed above with respect to block 430. Then, at block 450, the original and the related content items are merged together into a single set of content items.

Subsequently, at block 460, entity annotations corresponding to the content items in the single set are identified. Then, at block 470, the content items from the single set are grouped according to the identified entities. As a content item may be annotated with multiple entities, it is possible that a content item may appear multiple times among the groups of identified entities.

Lastly, at block 480, for each entity group, a children's affinity score is calculated for the entity. In one implementation, the children's affinity score for the entity is calculated using a function of annotation score for content items in the group, average quality of content items in the group, average popularity of content items in the group, and average relatedness weight between content items in the group.

FIG. 5 is a flow diagram illustrating a method 500 for curating children's content for a children's content interface using children's affinity scores of entities of a content sharing platform according to an implementation of the present disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by children's content curation module 230 as shown in FIG. 2.

Although method 500 is described as curating channels for a children's content interface, other types of content may also be curated using method 500, such as playlists, individual videos, and so on. Referring to FIG. 5, at block 510, method 500 identifies a set of candidate content channels based on predetermined initial qualifications. In one implementation, the predetermined initial qualifications may include, but are not limited to, categories of the channel, upload state of the channel, number of content items in the channel, and content review status of the channel.

At block 520, entities annotated for the candidate channels are identified. In addition, the children's affinity score for each of the identified entities is also determined. In one implementation, the children's affinity score for the entity may be calculated using method 400 described with respect to FIG. 4.

At block 530, for each content item in each candidate channel, an average children's affinity sore for the content item is calculated. In one implementation, the average children's affinity score may be calculated based on all entities annotated for the content item, where the average children's affinity score for the content item is weighted by a view count for the content item. Then, at block 540, for each candidate channel, the weighted average children's affinity scores for the content items in the channel are aggregated.

Subsequently, at block 550, the aggregated weighted average children's affinity score is assigned as the children's affinity score for the candidate channel. At block 560, the children's affinity scores for the candidate channels are normalized. Then, at block 570, the candidate channels are ranked in accordance with the normalized children's affinity scores for the candidate channels. Lastly, at block 580, the top N ranked candidate channels are selected as curated content for a children's content interface of the content sharing platform. In one implementation, the value of N may be a predetermined number of a predetermined percentage of channels.

FIG. 6 illustrates an example screenshot of a children's home screen UI 600 providing content suggestions for children from a content sharing platform according to implementations of the disclosure. FIG. 6 illustrates an example screenshot of a children's home screen UI 600 provided to a user viewing a home screen page of a children's portion of a content sharing platform.

Children's home screen UI 600 may include a navigation bar running on the top of the UI 600 including category icons 610 and a recommendations icon 615. The category icons 610 may include a shows icon 611, a music icon 612, a learning icon 613, and an explore icon 614. As previously discussed, the categories provided in the UI 600 may vary in implementations of the disclosure and are not limited to those described herein. A search icon 620 is also displayed in UI 600.

When one of the category icons 610 or the recommendations icon 615 is selected, a one or more content icons 630 are rendered in the UI 600. The content icons 630 correspond to the category icon 610 or recommendations icon 615 selected via the UI 600 (e.g. by user). The content icons 630 may correspond to content such as channels or playlist, or content items such as videos. The content icons 630 displayed for a particular category icon 610 may be the content curated for children by a children's content system per the processes described above with respect to FIGS. 1 through 5. For example, as illustrated in FIG. 6, content icons 630 correspond to channels of a content sharing platform selected as interesting and/or relevant to children by using children's affinity scores for entities of a content sharing platform. In some implementations, one or more category icons may refer to individual videos.

Figure 7:
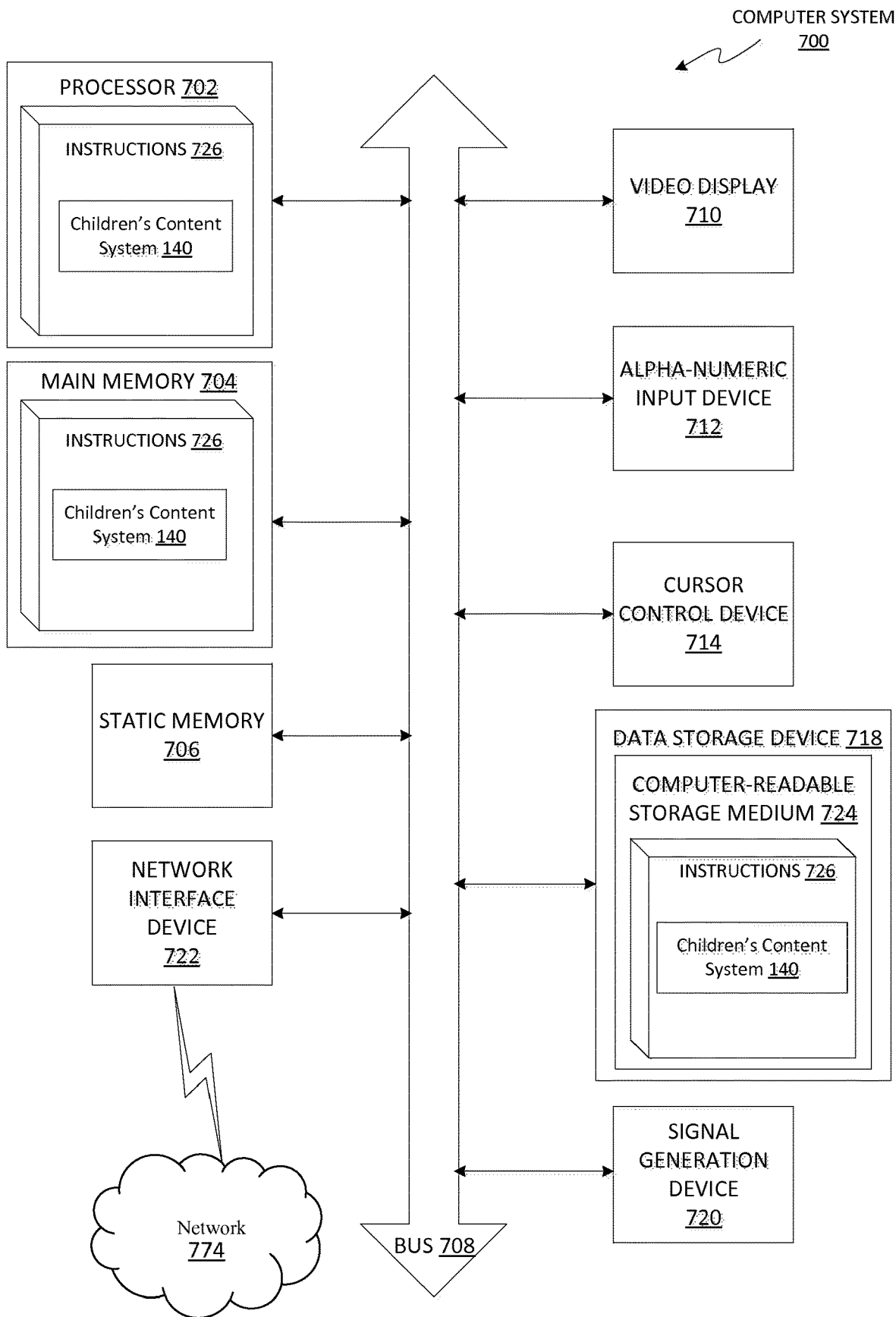
FIG. 7 is a block diagram illustrating one implementation of a computer system, according to an implementation.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 700 may be representative of a server, such as server 102, executing a children's content system 140, as described with respect to FIGS. 1 and 2.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 702 is configured to execute processing logic 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a computer-readable storage medium 724 (also referred to as a machine-readable storage medium), on which is stored one or more set of instructions 726 (e.g., software) embodying any one or more of the methodologies of functions described herein. The instructions 726 may also reside, completely or at least partially, within the main memory 704 and/or within the processing device 702 during execution thereof by the computer system 700; the main memory 704 and the processing device 702 also constituting machine-readable storage media. The instructions 726 may further be transmitted or received over a network 774 via the network interface device 722.

The computer-readable storage medium 724 may also be used to store instructions to perform a method for identifying content appropriate for children algorithmically without human interaction, as described herein. While the computer-readable storage medium 724 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method of automatically identifying content appropriate for children from a large volume of base content of a content sharing platform having a high rate of incoming new content to add to the base content, comprising:
    accessing, by a processing device, a knowledge graph comprising a knowledge base having structured information about a corpus of entities;
    identifying, by the processing device, entities from the corpus of entities in the knowledge graph, the entities corresponding to topics relevant to children, wherein the topics comprise a curated list of topics identified as relevant to children and inferred topics identified based on queries of the knowledge graph entities;
    generating, by the processing device, a children affinity score for each of the identified entities;
    selecting, by the processing device, the content of the base content from the content sharing platform based on the children affinity score of the identified entities corresponding to the selected content; and
    adding the selected content to a children content system of the content sharing platform.

2. The method of claim 1, wherein the entities comprise at least one a person, place, or thing.

3. The method of claim 1, wherein the knowledge base further comprises relational connections between the corpus of entities.

4. The method of claim 3, wherein identifying the entities further comprises:

accessing an external source of data relevant to content for children;

extracting topics for children from the external source of data;

reconciling the extracted topics with the corpus of entities determined from the knowledge graph; and extending the entities from the knowledge graph with reconciled entities from the extracted topics.

5. The method of claim 4, wherein the external source of data comprises a trusted website that publishes rating and reviews for children-safe and children-interesting content.

6. The method of claim 1, wherein generating the children affinity score further comprises:

identifying content items annotated with the entities;

identifying other content items related to the identified content items based on co-watch signals and co-occurrence signals;

merging the identified other content items with the identified content items to generate a single set of content items;

grouping the single set of content items by the entities annotated in the single set of content items to form an entity group for each entity; and for each entity having an entity group, calculating the children affinity score for the entity based on at least one of annotation centrality, annotation relevance, average quality, popularity, or average relatedness weight of content items in the entity group.

7. The method of claim 6, further comprising filtering the identified content items for at least one of language, quality, popularity, or content rating.

8. The method of claim 1, wherein selecting the content further comprises:

identifying a candidate set of content based on at least one of a category of content, upload state, or number of content items associated with content;

for each candidate content:

identifying entity annotations for each content item in the candidate content;

determining an average rating and a view count for each content item in the candidate content; and aggregating the average rating and the view count from all content items of the candidate content weighted by the identified entity annotations to generate an aggregate score for the candidate content;

normalizing the aggregated scores from all of the candidate content; and ranking the candidate content based on the normalized aggregated scores.

9. The method of claim 1, wherein the selected content comprises channels of a content sharing platform.

10. The method of claim 1, wherein the selected content comprises playlists of the content sharing platform.

11. A system for automatically identifying content appropriate for children from a large volume of base content of a content sharing platform having a high rate of incoming new content to add to the base content, comprising:

a memory; and a processing device coupled to the memory, wherein the processing device is to:

access a knowledge graph comprising a knowledge base having structured information about a corpus of entities;

identify entities from the corpus of entities in the knowledge graph, the entities corresponding to topics relevant to children, wherein the topics comprise a curated list of topics identified as relevant to children and inferred topics identified based on queries of the knowledge graph entities;

generate a children affinity score for each of the identified entities;

select the content of the base content from the content sharing platform based on the children affinity score of the identified entities corresponding to the selected content; and add the selected content to a children content system of the content sharing platform.

12. The system of claim 11, wherein the entities comprise at least one a person, place, or thing.

13. The system of claim 11, wherein the knowledge base further comprises relational connections between the corpus of entities.

14. The system of claim 13, wherein the processing device to identify the entities further comprises the processing device to:

access an external source of data relevant to content for children;

extract topics for children from the external source of data;

reconcile the extracted topics with the corpus of entities determined from the knowledge graph; and extend the entities from the knowledge graph with reconciled entities from the extracted topics.

15. The system of claim 11, wherein the processing device to generate the children affinity score further comprises the processing device to:

identify content items annotated with the entities;

identify other content items related to the identified content items based on co-watch signals and co-occurrence signals;

merge the identified other content items with the identified content items to generate a single set of content items;

group the single set of content items by the entities annotated in the single set of content items to form an entity group for each entity; and for each entity having an entity group, calculate the children affinity score for the entity based on at least one of annotation centrality, annotation relevance, average quality, popularity, or average relatedness weight of content items in the entity group.

16. The system of claim 15, wherein the processing is further to filter the identified content items for at least one of language, quality, popularity, or content rating.

17. The system of claim 11, wherein the processing device to select the content further comprises the processing device to:

identify a candidate set of content based on at least one of a category of content, upload state, or number of content items associated with content;

for each candidate content:

identify entity annotations for each content item in the candidate content;

determine an average rating and a view count for each content item in the candidate content; and aggregate the average rating and the view count from all content items of the candidate content weighted by the identified entity annotations to generate an aggregate score for the candidate content;

normalize the aggregated scores from all of the candidate content; and rank the candidate content based on the normalized aggregated scores.

18. A non-transitory machine-readable storage medium for automatically identifying content appropriate for children from a large volume of base content of a content sharing platform having a high rate of incoming new content to add to the base content, wherein the non-transitory machine-readable storage medium storing instructions which, when executed, cause a processing device to perform operations comprising:

accessing, by the processing device, a knowledge graph comprising a knowledge base having structured information about a corpus of entities;

identifying, by the processing device, entities from the corpus of entities in the knowledge graph, the entities corresponding to topics relevant to children, wherein the topics comprise a curated list of topics identified as relevant to children and inferred topics identified based on queries on the knowledge graph entities;

generating, by the processing device, a children affinity score for each of the identified entities;

selecting, by the processing device, the content of the base content from the content sharing platform based on the children affinity score of the identified entities corresponding to the selected content; and adding the selected content to a children content system of the content sharing platform.

19. The non-transitory machine-readable storage medium of claim 18, wherein the knowledge base further comprises relational connections between the corpus of entities.

20. The non-transitory machine-readable storage medium of claim 19, wherein identifying the entities further comprises:

accessing an external source of data relevant to content for children;

extracting topics for children from the external source of data;

reconciling the extracted topics with the corpus of entities determined from the knowledge graph; and extending the entities from the knowledge graph with reconciled entities from the extracted topics.

21. The non-transitory machine-readable storage medium of claim 18, wherein generating the children affinity score further comprises:

identifying content items annotated with the entities;

identifying other content items related to the identified content items based on co-watch signals and co-occurrence signals;

merging the identified other content items with the identified content items to generate a single set of content items;

grouping the single set of content items by the entities annotated in the single set of content items to form an entity group for each entity; and for each entity having an entity group, calculating the children affinity score for the entity based on at least one of annotation centrality, annotation relevance, average quality, popularity, or average relatedness weight of content items in the entity group.

22. The non-transitory machine-readable storage medium of claim 21, wherein the operations further comprise filtering the identified content items for at least one of language, quality, popularity, or content rating.

23. The non-transitory machine-readable storage medium of claim 18, wherein selecting the content further comprises:

identifying a candidate set of content based on at least one of a category of content, upload state, or number of content items associated with content;

for each candidate content:
  identifying entity annotations for each content item in the candidate content;
  determining an average rating and a view count for each content item in the candidate content; and
  aggregating the average rating and the view count from all content items of the candidate content weighted by the identified entity annotations to generate an aggregate score for the candidate content;

normalizing the aggregated scores from all of the candidate content; and ranking the candidate content based on the normalized aggregated scores.

24. The non-transitory machine-readable storage medium of claim 18, wherein the selected content comprises at least one of channels of a content sharing platform or playlists of the content sharing platform.

* * * * *